United States Patent [19]

Chapin et al.

[11] Patent Number: 4,805,301

[45] Date of Patent: Feb. 21, 1989

[54] CONDUCTOR STRIPPING TOOL

[75] Inventors: David S. Chapin, Raleigh, N.C.; Paul D. Stack, Jr., Cadillac, Mich.

[73] Assignee: Cooper Industries, Inc., Houston, Tex.

[21] Appl. No.: 76,957

[22] Filed: Jul. 23, 1987

[51] Int. Cl.⁴ .............................................. H02G 1/12
[52] U.S. Cl. .................................................... 30/90.1
[58] Field of Search ..................... 81/9.4, 9.44; 30/90.1

[56] References Cited

U.S. PATENT DOCUMENTS 4,108,028 8/1978 Perrino ................................. 30/90.1
4,117,749 10/1978 Eoonomu .............................. 30/90.6

Primary Examiner—Roscoe V. Parker
Attorney, Agent, or Firm—Alan R. Thiele; Eddie Scott

[57] ABSTRACT

A tool for stripping insulation or cladding from a conductor includes a pair of oppositely opposed notched cutting blades which are mounted in blade holders. The blade holders are guided into contact with the insulation or cladding by slots contained in a housing and stopped before the cutting blades contact the conductor. The movement of the cutting blades into contact with the insulation is caused by the squeezing of a pair of handles which are resiliently mounted within a housing. The central portion of the housing includes a slot for measuring the length of insulation or cladding to be stripped from the conductor.

18 Claims, 4 Drawing Sheets

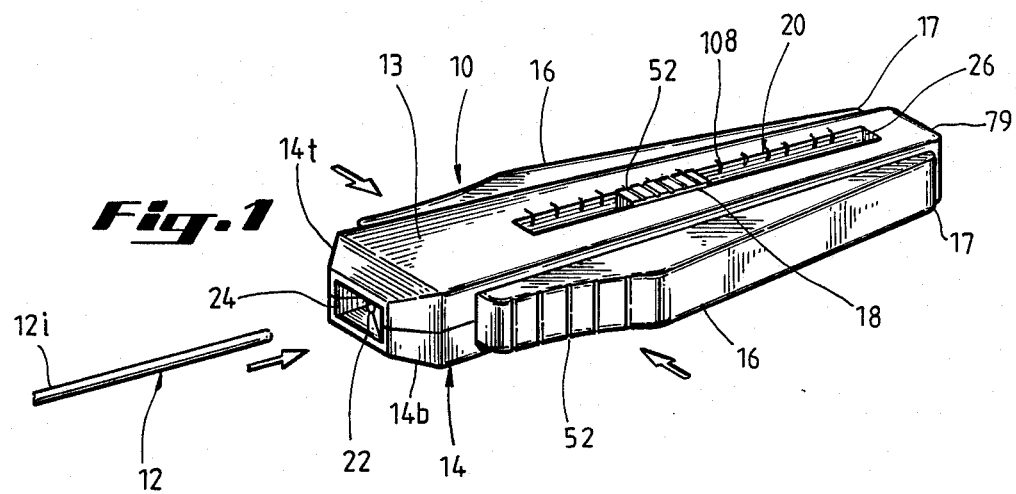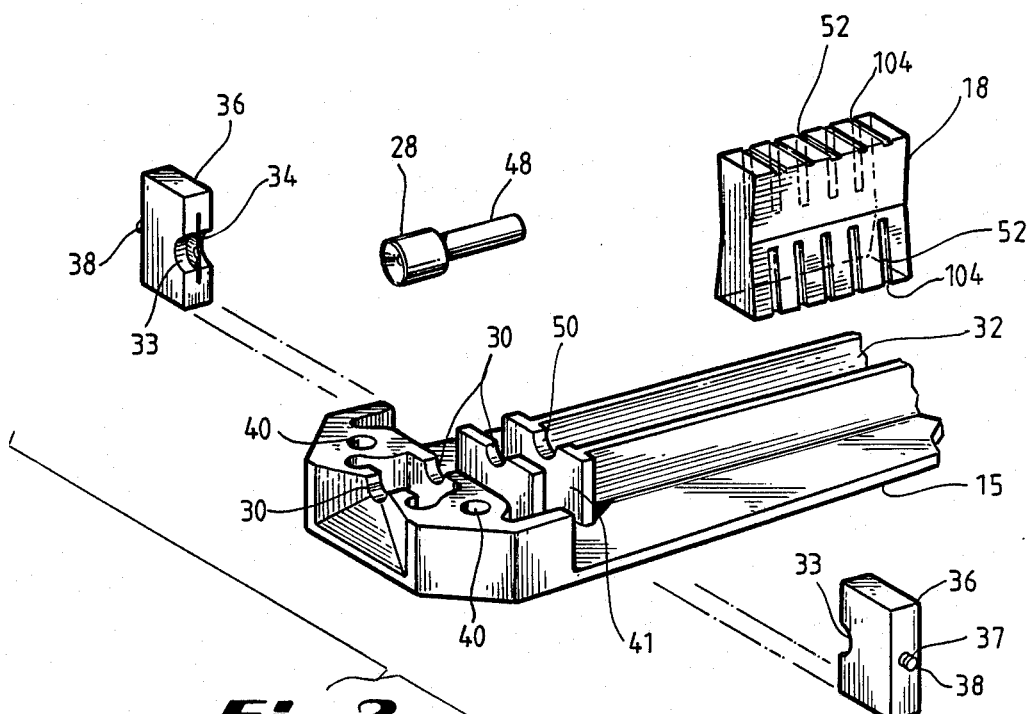

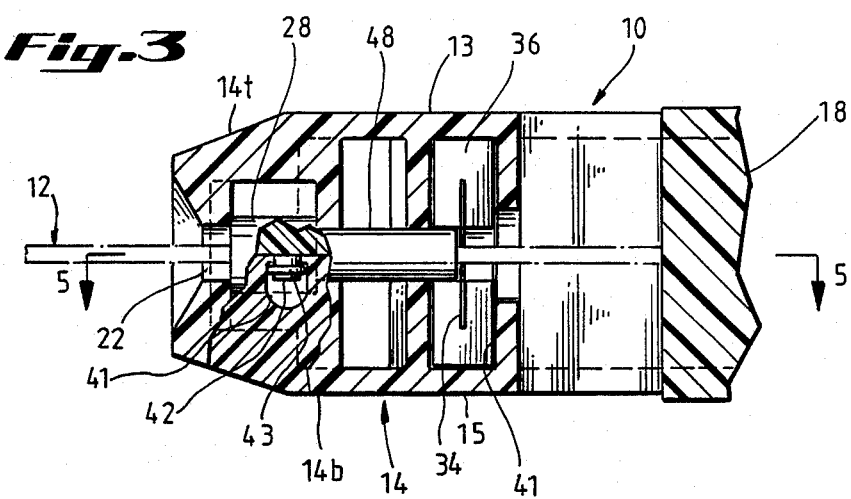
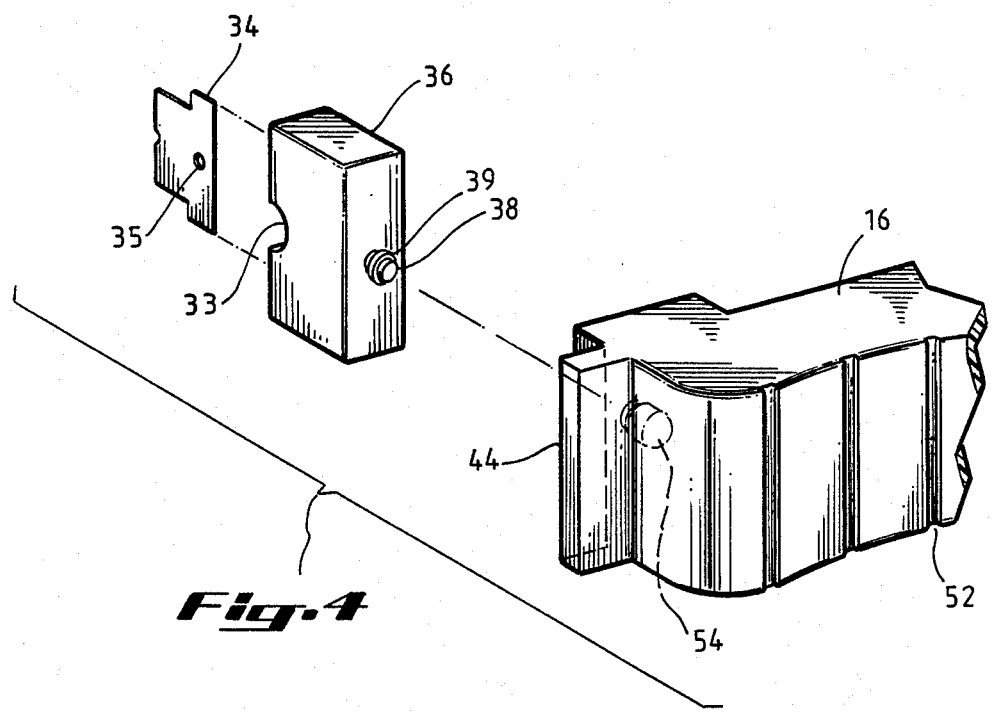

CONDUCTOR STRIPPING TOOL

BACKGROUND OF THE INVENTION

This invention relates to tools for stripping insulation or coating from a wire or a linear conductor; more particularly, this invention relates to hand-held insulation stripping tools which sever insulation or cladding and remove it from the conductor without nicking or scratching the conductor.

Stripping tools of various designs are a common item found in the tool box of electricians or service technicians. Such tools may be difficult to use and inaccurate, particularly when it is desired to expose only a predetermined length of a conductor. Additionally, such prior art tools may nick or scratch the conductor. Such nicks or scratches may reduce the strength of the conductor or may alter its conductive properties, particularly, when the conductor is a fiber optic device. Hence, such nicks or scratches should be avoided.

There is therefore a need in the art to provide a convenient, easy to use tool which allows the user to adequately and appropriately measure the length of conductor to be exposed after the insulation or cladding has been removed without nicking or scratching of the conductor.

SUMMARY OF THE INVENTION

A convenient, easy to use tool for stripping a predetermined length of insulation or cladding from a conductor without contacting the conductor is built around a pair of oppositely opposed, converging notched cutting blades. The converging notched cutting blades are mounted in individual blade holders which are guided into contact with the insulation or cladding on the conductor by a pair of slots which guide the individual blade holders both into and away from the conductor.

The converging notched cutting blades are moved towards the conductor by a pair of handles which are formed on opposite sides of a housing. The handles are integrally formed as part of the housing and are biased outwardly by a resilient hinges at their bases and inward spring extensions in their midst. The combination of the resilient hinges and inward spring extensions allows for the returning of the notched blades to an open position once insulation or cladding has been stripped from a conductor. The handles are positioned such that they may be easily actuated by the squeezing of a human hand.

The housing in which the converging notched blades and their bladeholders are mounted includes a slot for guiding the notched blades into contact with the conductor and a tube for positioning the conductor with respect to the blades. The tube both guides the conductor into a central space and prevents the blades from nicking or scratching the conductor. When the end of the conductor contacts a positionable positive stop within the housing, the converging notched blades are in the desired position for stripping a predetermined length of insulation or cladding from the conductor. A portion of the positionable positive stop protrudes through a slot in the housing so that it may be adjusted for removing the desired amount of insulation or cladding from the conductor. Located on one or both sides of the slot is a scale by which the length of the conductor from which the insulation or cladding to be stripped is measured.

BRIEF DESCRIPTION OF THE DRAWINGS

A better understanding of the conductor stripping tool of the present invention may be had by reference to the drawings wherein:

FIG. 1 is a perspective view of the stripping tool of the present invention;

FIG. 2 is an exploded perspective view of the stripping tool with the top portion removed;

FIG. 3 is a vertical cross-sectional view;

FIG. 4 is an exploded perspective view of the notched blade mounting arrangement;

DESCRIPTION OF THE EMBODIMENTS

Figure 5:
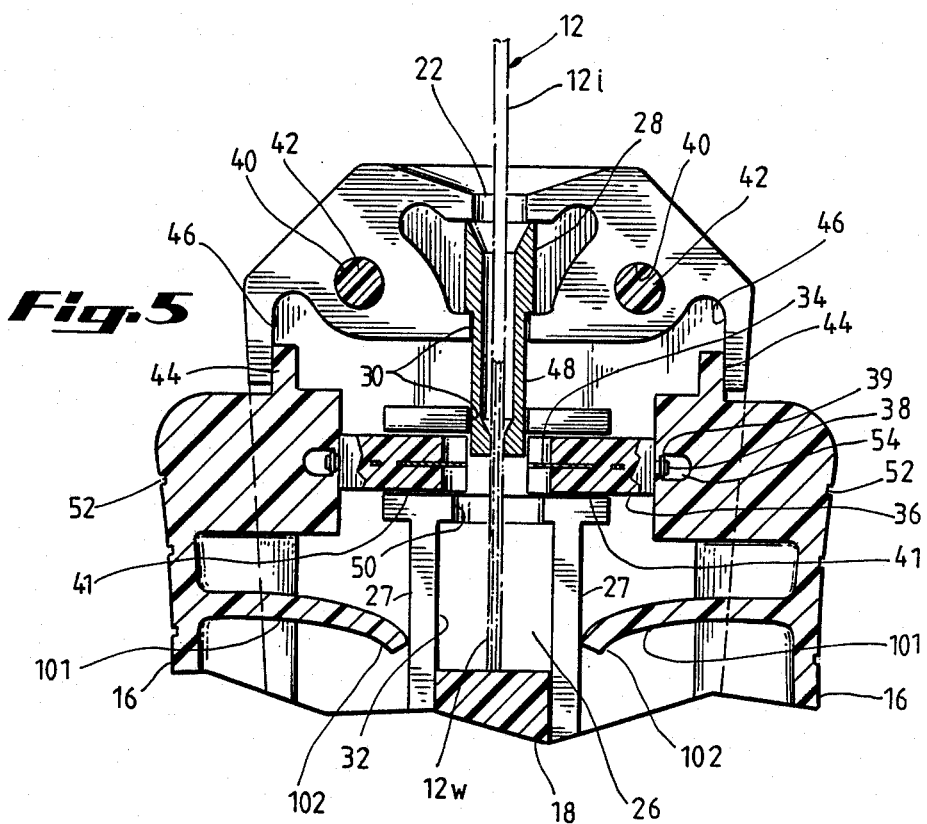
FIG. 5 is a cross-sectional view taken along line 5—5 of FIG. 3 with the stripping tool in its open position.

FIGS. 1 and 2 illustrate the three essential parts of the stripping tool 10 of the present invention. All of these essential parts are located within housing, generally 14. The first part of the stripping tool is the tapered guide portion 24 which terminates in opening 22. It is through opening 22 that an insulated or clad conductor 12 is placed into the interior of stripping tool 10.

The second key part of stripping tool 10 is central slot 26. Mounted within central slot 26 is movable positionable positive stop 18. When conductor 12 is inserted through opening 22 it passes into central slot 26 in housing 14 until it contacts stop 18 which has been positioned to gage the length of exposed conductor 12 remaining after the stripping of insulation or cladding 12i. To determine the length of conductor 12 to be exposed, a scale 20 is placed on housing 14. Scale 20 enables the user of tool 10 to position stop 18 such that the length of central slot 26 is sufficient to cause the desired length of exposed conductor 12 to remain after the insulation or cladding 12i has been removed. In the preferred embodiment an English measure is placed on one side of slot 26 and a metric measure is placed on the other side. Scale 20 is characterized by raised ribs 108 which project from housing 14. Ribs 102 extend into slot 26.

Movable stop 18 includes a series of depressions 104 formed on both sides. Depressions 104 are compatible in size with and match the spacing of ribs 108 which form scale 20. The interfitment between depressions 104 in the sides of stop 18 and ribs 108 in slot 26 holds stop 18 in a fixed position with respect to slot 26. Such fixed position prevents inadvertment movement of stop 18 during the stripping operation and assures consistency and accuracy in the length of conductor 12 exposed.

The third key portion of stripping tool 10 is a pair of movable handles 16. Movable handles 16 are what the user of the tool pushes inwardly to move notched blades 34 into contact with the insulation or cladding 12i on conductor 12. Once notched blades 34 have severed insulation or cladding 12i after the end of conductor 12 has contacted stop 18, the desired amount of insulation or cladding 12i may be removed from conductor 12 by pulling conductor 12 and tool 10 apart.

An initial understanding of how stripping tool 10 is constructed to accomplish the removal of insulation or cladding 12i from conductor 12 may be had by reference to FIG. 2. Therein an exploded perspective view of the front end of tool 10 is shown. Two blade holders 36 are disposed on either side of stripping tool 10. Blade holders 36 each contain a notched blade 34 and move within blade holder path 41 to contact the insulation or cladding 12i on conductor 12.

In FIG. 3 it may be seen that conductor 12 passes through opening 22, through tubes 28 and 48 enroute to movable stop 18. Large tube 28 and smaller tube 48 are formed together as a single part which nests within two openings 30 (FIG. 2). Smaller tube 48 terminates just before the point where blades 34 contact the insulation or cladding 12i on conductor 12 to provide maximum support. Once exiting smaller tube 48 conductor 12 passes through opening 50 and into the upper portion of slot 26 whose length is determined by the position of movable stop 18 in stop guide path 32.

A further understanding of how blade holders 36 fit within stripping tool 10 and how the top portion 14t and bottom portion 14b of housing 14 fit together to form housing 14 may be had by reference to FIG. 3. Therein it may be seen that top portion 14t and bottom portion 14b are held together by the interference fit of peg 42 and peg ring 43 within cavity 41. Peg 42 may be seen in cross section in FIGS. 5 and 6. When top portion 14t and bottom portion 14b are snapped together, tube 28 and 48, blade holders 36 and slide 18 are contained within housing 14.

Figure 6:
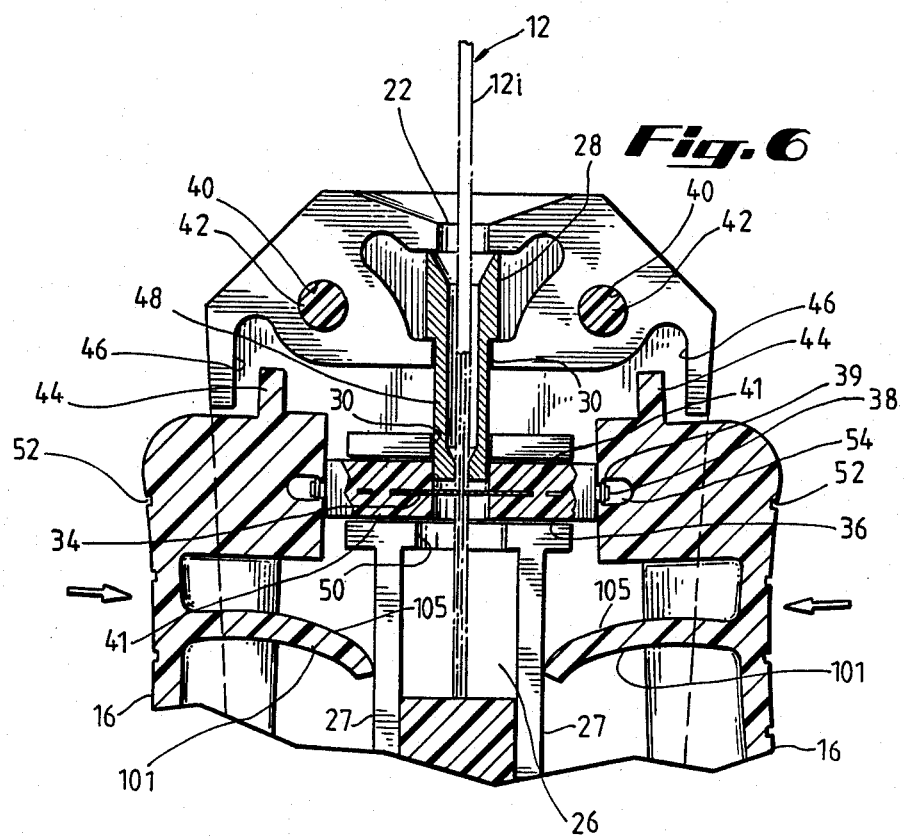
FIG. 6 is a cross-sectional view taken along line 5—5 of FIG. 3 with the stripping tool in its closed position.

The mounting of blade holders 36 on movable handles 16 may be seen by reference to FIGS. 5 and 6. This mounting is accomplished by the interference fitment of pin ring 39 on pin 38 in cavity 54. As may be seen by further reference to FIG. 4, notched blade 34 may be molded as an integral part of blade holder 36 by causing the plastic to flow through hole 35 in notched blade 34.

The internal cooperation of the various parts to remove insulation or cladding 12i from conductor 12 may be seen by reference to FIGS. 5 and 6. Conductor 12 is first inserted through opening 22. Once inserted through opening 22 it passes through tubes 28 and 48 before entering slot 26 where it comes to rest against movable stop 18. Movable stop 18 is positioned with respect to either the English or Metric scale 20 formed on the top surface 13 of housing 14 by the interengagement of ribs 108 with notches 104 (FIG. 1). Once conductor 12 is in position movable handles 16 are squeezed together as shown by the arrows in FIG. 6.

In the open position shown in FIG. 5, movable handles 16 are biased outwardly by hinge portion 17 (FIG. 1) and by inward spring extension 101. Retaining handles 16 within housing 14 position are stops 44 which rest against inside wall 46 of housing 14. Inward spring extensions 101 are integrally formed on the inside of arms 16 and are free to move at their inside ends 105. Inside ends 105 contact outside wall 27 of slot 26. Because inward spring extensions 101 are longer than the distance from arms 16 to outside wall 27 of slot 26, inward spring extensions 101 are forced to bend when arms 16 are pushed together. It is this bending that biases return arms 16 and assist tool 10 in returning to its open position.

The connection of blade holders 36 to handles 16 by an interference fit of pin ring 39 in cavity 54 allows pin 38 to pivot with respect to handles 16. This pivoting allows for non-binding movement of the blade holders 36 when moved along blade holder path 41.

Figure 7A:
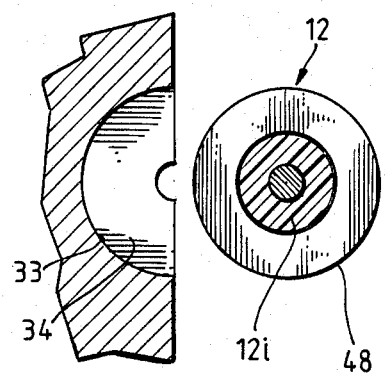
FIGS. 7A, 7B and 7C illustrate the severing of insulation or cladding.
Figure 7B:
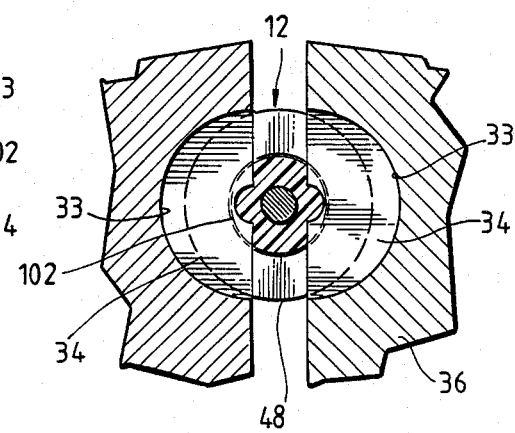
Figure 7C:
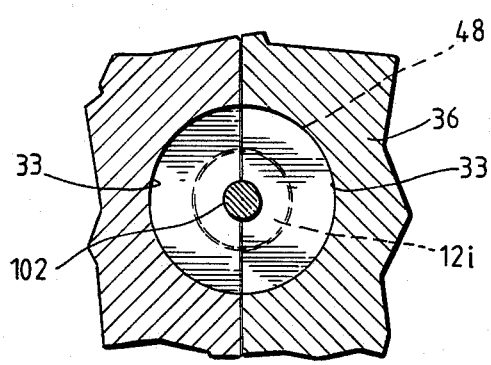

The actual cutting of insulation 12i from around the wire 12 is accomplished as is shown in FIGS. 6, 7A, 7B and 7C. When movable handles 16 are pushed inwardly blade holders 36 pass along path 41 thus causing notched blades 34 to contact and cut insulation 12i on insulated conductor 12. Scratching or notching of conductor 12 is prevented by the contact of C-shaped opening 33 in blade holder 36 with tube 48 as shown in FIGS. 7A, 7B and 7C which depict the passage of notched blades 34 through insulation or cladding 12i. As conductor 12 and insulation stripping tool 10 are pulled apart, the insulation or cladding 12i stripped from the end of conductor 12 remains within insulation removing tool 10 and conductor 12 is removed leaving an uninsulated portion of conductor 12 exposed.

To facilitate contact between the users hand and movable handles 16, notches 52 may be formed in the side of movable handles 16.

The entire insulation removing tool 10 may be formed of plastic except for blades 34 and tubes 48 and 28. Because of the unique design shown, the entire plastic housing 14 may be formed as a single integral unit wherein top portion 14t of housing 14, bottom portion 14b of housing 14 and movable handles 16 are all attached together at a common base 79 (FIG. 1). Device 10 is assembled by inserting tubes 48 and 28 into bottom portion 14b of housing 14, inserting blade holders 36 in blade path 41, inserting movable stop 18 in guide path 32, making the appropriate connections of blade holders 36 with handles 16 and then snapping top portion 14t of housing 14 onto bottom portion 14b of housing as shown in FIG. 3. The connection between the bottom of the handles 16 and the housing and the contact of inward spring extensions 101 with the outside 27 of slot 26 causes handles 16 to be outwardly biased. Therefore, when handles 16 are squeezed inwardly so as to cut insulation 12i, the bottom of handles 16 being integrally formed with housing 14 and the contact of inward spring extensions 101 with the outside 27 of slot 26 causes handles 16 to be biased outwardly such that stop 44 contacts inside wall 46 of housing 14.

There is thereby provided by the insulation stripping tool of the present invention a convenient, easy-to-use device which allows the user to accurately and consistently measure the length of a conductor to be exposed once insulation or cladding has been removed. Additionally, insulation or cladding may be removed from the conductor without scratching or nicking the conductor. The stripping device of the present invention has been shown in its preferred embodiment and accordingly it will be understood that the invention is described by the claims as interpreted by one of ordinary skill in the art.

I claim:

1. A tool for stripping insulation or cladding from a conductor comprising:
 a pair oppositely opposed pivotably mounted notched cutting blades;
 means for moving said oppositely opposed pivotably mounted notched cutting blades from an open position to a position where said notch is in contact with the insulation or cladding on the conductor;
 means for stopping the movement of said oppositely opposed pivotably mounted notched cutting blades before making contact with the conductor;
 means for resiliently returning said oppositely opposed pivotably mounted notched cutting blades to an open position;
 a housing including:
 means for guiding said notched blades;

means for positioning the conductor with respect to said oppositely opposed pivotably mounted notched cutting blades.

2. The tool as defined in claim 1 wherein said oppositely opposed pivotably mounted notched cutting blades are mounted in blade holders.

3. The tool as defined in claim 1 wherein said means for manually moving said oppositely opposed pivotably mounted notched cutting blades from an open position to a position in contact with the insulation or cladding on the conductor and said means for resiliently returning said oppositely opposed pivotably mounted notched cutting blades to an open position are handles integrally formed in said housing.

4. The tool as defined in claim 2 wherein said blade holders ride in a slot formed in the interior portion of said housing.

5. The tool as defined in claim 4 wherein said means for positioning the conductor with respect to said oppositely opposed pivotably mounted notched cutting blades includes a tube positioned in said housing and an adjustable stop member for contacting the end of the conductor.

6. The tool as defined in claim 5 wherein said means for stopping of the movement of said oppositely opposed pivotably mounted notched cutting blades is the contact of said blade holders with said tube.

7. The tool as defined in claim 6 further including a measuring scale on said housing for locating said adjustable stop.

8. The tool as defined in claim 7 wherein said adjustable stop is positioned by the interfitment of ribs on said housing with depressions formed in said adjustable stop.

9. A tool for stripping insulation or cladding from a conductor comprising:
a pair of oppositely opposed notched cutting blades pivotably mounted in blade holders;
means for manually moving said blades and blade holders from as open position to a position in contact with the insulation or cladding on the conductor;
means for stopping the travel of said oppositely opposed pivotably mounted notched cutting blades before contacting the conductor;
means for resiliently returning said oppositely opposed pivotably mounted notched cutting blades to an open position;
a housing including:
a slot for guiding said blade holders;
means for positioning the conductor with respect to said oppositely opposed pivotably mounted notched cutting blades.

10. The tool as defined in claim 9 wherein said means for positioning the conductor with respect to said oppositely opposed notched cutting blades includes a tube and an adjustable stop located in said housing.

11. The tool as defined in claim 10 wherein said adjustable stop is selectively positionable.

12. The tool as defined in claim 11 further including a measuring scale located on said housing for positioning the adjustable stop.

13. The tool as defined in claim 9 wherein said means for manually moving said oppositely opposed notched cutting blades from an open position to a position in contact with the insulation or cladding on the conductor are handles integrally formed as part of said housing.

14. The tool as defined in claim 10 wherein said means for stopping the travel of said oppositely opposed notched cutting blades is the contact of said blade holders with said tube.

15. A tool for stripping insulation or cladding from a conductor comprising:
a pair of oppositely opposed notched cutting blades pivotably mounted in blade holders;
a pair of handles for manually moving said oppositely opposed pivotably mounted notched cutting blades from an open position to a position in contact with the insulation or cladding of the conductor and resiliently returning said oppositely opposed pivotably mounted notched cutting blades to an open position, said handles being integrally formed in said housing;
means for preventing said oppositely opposed pivotably mounted notched cutting blades from contacting said conductor;
a housing including:
a slot for guiding said blade holders;
means for positioning the conductor with respect to said oppositely opposed pivotably mounted notched cutting blades.

16. A tool as defined in claim 15 wherein said means for positioning the conductor with respect to said oppositely opposed notched cutting blades is a tube and an adjustable stop located in said housing.

17. A tool as defined in claim 16 wherein said adjustable stop is positionable by the interfitment of ribs on said housing and depressions on said adjustable stop.

18. The tool as defined in claim 17 wherein said housing includes a scale formed on said housing for measuring the length of the conductor.

* * * * *